Sept. 7, 1926.

G. ROMADKE

FISH LURE

Filed March 1, 1926

1,598,786

Patented Sept. 7, 1926.

1,598,786

UNITED STATES PATENT OFFICE.

GEORGE ROMADKE, OF DETROIT, MICHIGAN.

FISH LURE.

Application filed March 1, 1926. Serial No. 91,369.

I am aware that there are a number of fish lures already in common use but they are usually rigid so that if a fish once comes in contact with them he will not usually touch it again. Moreover the lures are so made that the hooks are not protected from weeds and consequently frequently become entangled when under water. Again the hooks on the lure and the eye by which the lure is attached to the line are usually separate parts attached to the lure itself.

In the present invention the lure consists of a resilient body, usually in the form of a fish, so made that if a fish comes in contact with it will give, and consequently he will bite at it again if he is not caught on one of the hooks at his first attempt. The body of the lure is provided with resilient projecting portions, generally in the form of fins, which are placed directly in front of, and in proximity to, the hooks. In this manner the possibility of the hooks becoming entangled with weeds is materially reduced. The projecting portions are of such strength that the weight of a fish will flex them sideways and allow it to be caught on the hook it protects. Again the lure is so constructed that a rigid member passes right through the lure and the hooks and the attaching eye forms an integral part of the member. In this manner the lure is strengthened and there is no possibility of a fish breaking away with a loose hook.

A further object of the invention is to provide a second attaching eye on the upper side of the body of the lure also connected to the rigid member so that the lure may also be utilized as a decoy.

Having thus briefly outlined the invention and the objects to be achieved, I will now describe an embodiment thereof with the aid of the accompanying drawing.

Figure 1:
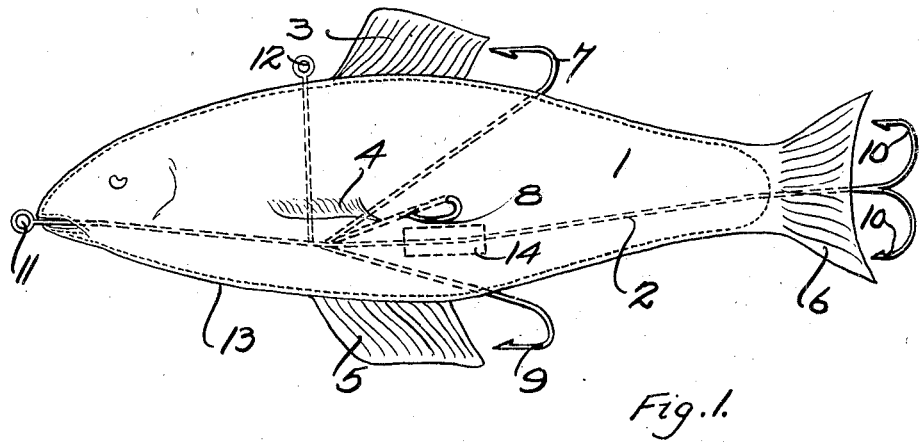
Figure 1 shows a side elevation of the lure.
Figure 2:
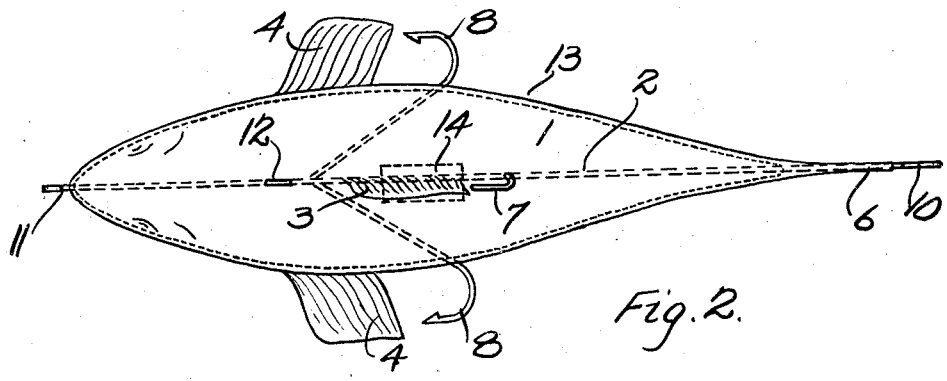
Figure 2 is a plan thereof.

The body of the lure consists of an inner filling 1 of resilient material such as porous or sponge rubber. Through the filling a rigid longitudinal member 2 generally made of wire extends from one end to the other, and around the filling a casing 13 is formed. This casing is also resilient and is preferably made of rubber. Integral with the casing are projecting portions 3, 4, 5, and 6 in the form of top, side, and bottom fins and a tail. These projecting portions are made of resilient material and of sufficient strength to remain in their respective positions if only a light obstacle is encountered but to be flexed sideways when subjected to the weight of a fish against them.

Behind the fins 3, 4, and 5 and the tail 6 hooks 7, 8, 9 and 10 respectively are arranged. All these hooks are integral with, and usually soldered or welded to, the rigid member 2. It will also be noted that that portion of the hooks 7, 8, and 9 within the filling 1 slope diagonally backwards so as to give a better pull on the eye 11 in which the front end of the rigid member 2 terminates.

In order to be able to employ the lure also as a decoy for attracting fish when spearing I also provide an eye 12 on the upper side of the body of the lure. This eye is attached to the rigid member 2 by a flexible connection, such as steel wire, so as not to interfere with the resiliency of the body.

In order to cause the lure to sink to a greater depth in the water the rigid member 2 may be weighted as shown at 14. It will also be noted that the rigid member passes through the body slightly below the centre so as to maintain the lure in its correct position in the water.

While in the foregoing description the lure has been described as being in the form of a fish obviously it may take other forms when desired.

Having thus described my invention what I claim and desire to secure by Letters Patent is:

1. In a fish lure, the combination of a resilient one-piece water-proof body casing having a filling of spongy material therein, a rigid member extending longitudinally through both ends of said casing and through said filling, a weight secured to said rigid member within said filling, an attaching means integral with said member outside the front of said casing, a hook outside the rear of said casing and integral with said member, hooks attached to said rigid member within said casing, said hooks extending laterally and rearwardly through said filling and said casing, and flexible projections integral with said casing normally in front of said hooks but adapted to be flexed from in front of them by the weight of a fish.

2. In a fish lure, the combination as described in claim 1, wherein a flexible element is attached to said member within the filling, said element extending upwards through the filling and the casing and terminating in an attaching means outside said casing.

GEORGE ROMADKE.